US007110127B2

(12) United States Patent
Walker et al.

(10) Patent No.: US 7,110,127 B2
(45) Date of Patent: Sep. 19, 2006

(54) METHOD AND APPARATUS FOR PRODUCT REGIONALIZATION

(75) Inventors: Ray A. Walker, Eugene, OR (US); Andrew Joseph Zaremba, Corvallis, OR (US); Wayne Leaman Westly, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 822 days.

(21) Appl. No.: 09/773,479

(22) Filed: Jan. 31, 2001

(65) Prior Publication Data

US 2001/0019343 A1 Sep. 6, 2001

Related U.S. Application Data

(63) Continuation-in-part of application No. 09/295,080, filed on Apr. 20, 1999, now Pat. No. 6,312,106.

(51) Int. Cl.
*G06F 15/00* (2006.01)

(52) U.S. Cl. ...................................... 358/1.14; 358/1.1

(58) Field of Classification Search ............... 358/1.14, 358/1.1; 713/200, 182; 347/7, 19, 50, 14
See application file for complete search history.

(56) References Cited

U.S. PATENT DOCUMENTS

| | | | | |
|---|---|---|---|---|
| 5,589,859 | A * | 12/1996 | Schantz | 347/19 |
| 5,812,980 | A * | 9/1998 | Asai | 705/1 |
| 6,035,400 | A * | 3/2000 | Yasuoka | 713/200 |
| 6,227,643 | B1 * | 5/2001 | Purcell et al. | 347/19 |
| 6,312,106 | B1 * | 11/2001 | Walker | 347/50 |

OTHER PUBLICATIONS

American Heritage College Dictionary, Fourth Edition, 2002, Houghton Mifflin Company, p. 307.*

* cited by examiner

*Primary Examiner*—Gabriel I. Garcia

(57) ABSTRACT

Disclosed is a method of regionalizing a product for specific markets for the purposes of language localization, insuring compliance with local laws and standards, or theft prevention. The method is applicable to goods comprising an initially-sold machine or device and consumable items required by the machine or device. The method comprises regionalizing the consumable items; the first-installed consumable used in the machine or device then causes the machine or device to be regionalized, such that the machine or device subsequently only accepts consumables with the same regionalization. Also disclosed are apparatus to implement the method.

13 Claims, 8 Drawing Sheets

METHOD AND APPARATUS FOR PRODUCT REGIONALIZATION

CROSS REFERENCE TO RELATED APPLICATIONS

The present application is a continuation-in-part of U.S. patent application Ser. No. 09/295,080 filed Apr. 20, 1999, now U.S. Pat. No. 6,312,106, entitled "Method And Apparatus For Transferring Information Between A Replaceable Consumable And A Printing Device," assigned to the assignee of the present invention.

TECHNICAL FIELD OF THE INVENTION

The present invention relates to methods of regionalizing a product for specific markets for the purposes of language localization, insuring compliance with local laws and standards, or theft prevention, and apparatus for accomplishing the methods.

BACKGROUND OF THE INVENTION

A variety of situations exist in which it is desirable to "regionalize" a product, distinguishing that product from otherwise identical products elsewhere. Regionalization can allow a product to automatically configure related software, such as drivers and user manuals, to be displayed in a local language. Regionalization can help discourage the use of consumable items related to the product that are not intended for use in that region (due to non-compliance with local standards, or local intellectual property rights issues). "Regionalization" may also be used on a local scale to discourage theft of devices, such as within an organization or company, by configuring the devices to only accept consumables that are available from that organization or company.

Printers are an example of a product where regionalization is attractive. Printers are shipped worldwide, to many countries, to users of different nationalities. Many users in certain countries and regions have region-specific needs, such the need to have manuals and driver software programs that communicate in the local language. Failure to provide a local language interface can make it difficult for these users to properly operate the printer and to understand driver-generate messages.

One way to resolve this issue is to customize the printing systems—that is customize the printer hardware, driver software, and manuals to each country. This can add significant undesirable overhead costs for supporting the manufacture of printing systems unique to each country. Further, for manufacturing planning purposes, the demand of each individual country must be accurately predicted; otherwise, certain countries will experience either surpluses or shortages of printing systems resulting in either lost sales or excess inventory. There is thus a need for a regionalization system that allows products such as printers to be automatically configured to a particular region without unduly increasing production and distribution costs.

Another use for regionalization is the situation where consumable items, such as ink cartridges for printers, are not intended for distribution within certain regions. A particular ink cartridge design, for example, may contain an ink formulation for which the manufacturer does not own the local intellectual property rights, or which in some other way does not conform to local laws or standards (or there may be trademark issues related to the cartridge packaging). To help preclude the importation of the consumables into the region, it would be useful if the printers in the region in some manner declined to accept the cartridges.

A third use of regionalization is in a local setting, where an organization or company may own a large number of devices, such as printers, and wants to insure that the devices don't become targets for theft. It would be useful if the devices were "regionalized" to only accept consumables, such as ink cartridges, provided by the company or organization. If the devices were not usable with consumables from an outside source, the likelihood of theft would be reduced.

There is thus a need for methods and apparatus which allow manufacturers and distributors the ability to simply regionalize devices and consumable items utilized by the devices in a simple manner that does not incur undue manufacturing and distribution costs.

SUMMARY OF THE INVENTION

It is an object of the present invention to provide a method of regionalizing products. The method is applicable to goods comprising an initially-sold machine or device and consumable items required by the machine or device. The method comprises regionalizing the consumable items by writing to a memory device on the consumable; the first-installed consumable used in the machine or device then causes the machine or device to be regionalized, such that the machine or device subsequently only accepts consumables with the same regionalization.

It is a further object of the invention to provide apparatus for implementing the method of regionalization.

DETAILED DESCRIPTION OF THE PREFERRED EMBODIMENT

Summary of the Invention

Figure 1:
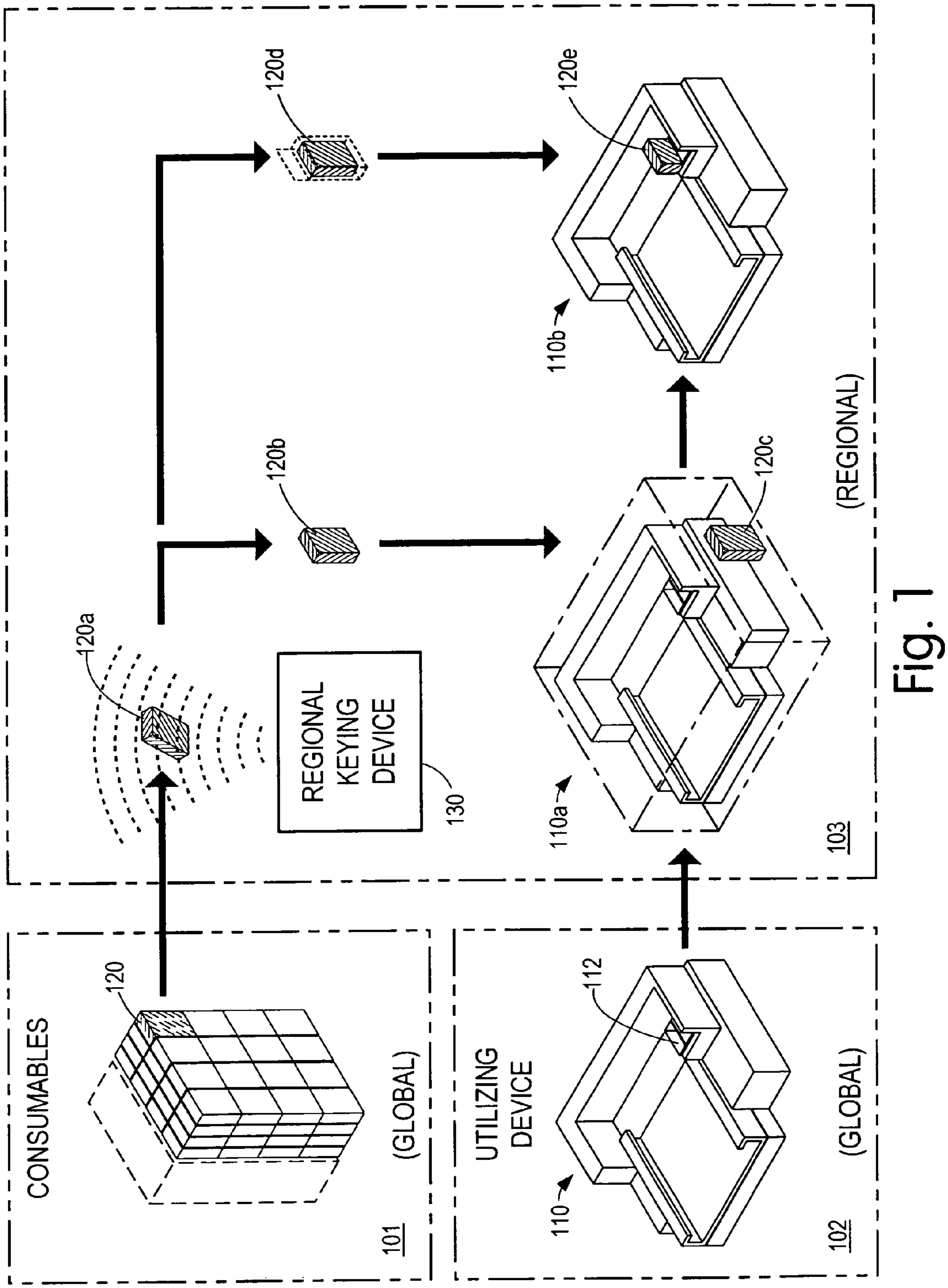
FIG. 1 is a conceptual block diagram illustrating the present invention as applied to an ink jet printer and print cartridges of the presently preferred embodiment.

FIG. 1 is a block diagram illustrating the concept of the present invention, showing how consumables and consumable utilizing devices are separately produced globally, are brought into a regional market, are "regionalized" for the market, and are distributed to consumers within the region. The consumable utilizing device may be a printer, plotter, fax machine, copier, a recording device which uses a removable media, or machinery having components which require periodic replacement due to wear (for illustrative purposes, an ink jet printer is shown in FIG. 1). The consumables are the corresponding ink or toner cartridges, recording media, or replacement mechanical assemblies. The invention is applicable to situations where a consumer first acquires a piece of equipment and then makes recurring purchases of a consumable item required for continued use of the equipment. In the applications envisaged for the present invention, the consumables are typically produced on vast scale at multiple facilities around the globe.

As denoted at 101, consumables, such as ink jet cartridges, are produced globally and distributed in bulk quantities around the globe. To minimize the cost of production and to avoid the need to precisely predict the volume demand of individual markets, the consumables are preferably made to a uniform design. A consumable produced at one facility is functionally identical to a consumable produced at any other facility around the world. A single cartridge 120 is depicted with broken cross shading to indicate that at this point in the distribution system it has yet to be "regionalized".

The consumable utilizing device, such as an ink jet printer 110, may similarly be produced at multiple facilities around the world, as denoted at 102. These may be different facilities, located in different countries, than the facilities producing the consumables (the utilizing devices, the consumables, or both, may also be produced in the region in which they are distributed). In the applications envisaged for the present invention, the utilizing device arrives at a regional facility absent the consumable item, as depicted at 112 by the empty ink cartridge slot.

It is an aspect of the present invention that the consumables include a memory component which may be altered after manufacture of the consumable is complete, and which may be read by the utilizing device. In the preferred implementation of the invention, the memory component is an electronic memory and the consumable includes a wireless link, such that the memory may be altered without the need for a mechanical electrical interconnection between the consumable and the utilizing device. The wireless link is preferably a radio frequency link, but may also be an optical link, a any other type of link that does not require a physical mechanical connection.

Alternatively, other memory components may utilized, such as an electrical component requiring an external electrical connection (see, for example, Bullock, U.S. Pat. No. 5,835,817, Replaceable Part for Integral Memory for Usage Calibration and Other Data). The memory also need not be electronic; any simple mechanical device having more than one state, or any mechanism which may be simply altered during regionalization, with the alteration later detectable by the utilizing device, may be used.

In the presently preferred implementation, the memory device and wireless data link on the consumable are shared with other circuitry used for monitoring the consumable status (such as an indication of the remaining ink volume), and compatibility information (such as color data and model number information). The memory device and wireless data link are attached to the consumable as part of a label assembly adhesively applied to the consumable.

When the consumables are prepared for distribution within a geographic region, they are regionalized by altering the included memory components with region keying device 130. Typically regionalization would occur at a regional packaging and distribution center. The keying device alters the content of the consumable memory by writing a "region tag" to the memory. As depicted in FIG. 1, the preferred embodiment keying device 130 is wireless, emitting an electronic signal which alters the memory within the consumable 120*a*. The wireless keying of the consumable makes it unnecessary to remove the consumable from the protective overwrap placed on the consumable during manufacture. The consumable memory and keying device will be discussed further, below.

Preparing the utilizing device for a regional market 103 will typically involve repackaging the device with region-specific packaging and user information, such as manuals written in the local language (alternatively, where regionalization is used for language localization, a CD-ROM may be included having drivers and manuals in many languages, with the initial regionalization of the device automatically selecting the appropriate language). A printer, for example, may be boxed as at 110*a*, with a consumable 120*c* included in the box. Under the present invention, the consumable included in the package with the utilizing device is preferably a regionalized consumable, as indicated at 120*b* and 120*c*, which has been "keyed" to the local region. Alternatively, in some types of devices it may be desirable to actually install a consumable into the device.

Other regionalized consumables go into the regional distribution channels as replacement consumables, as indicated at 120*d*. The consumables may be repackaged for sale in small or individual quantities.

It is envisioned that, under the preferred embodiment of the invention, a consumer will receive the utilizing device (such as an ink jet printer 110*b*), and, as part of installation and setup of the device will install the consumable packaged with the device (such as the ink jet cartridge 120*e*). Alternatively, the consumer may purchase a regionalized consumable through normal distribution channels. The consumer then supplies power to the utilizing device, and the utilizing device reads the memory of the consumable to determine the region information.

Figure 2A:
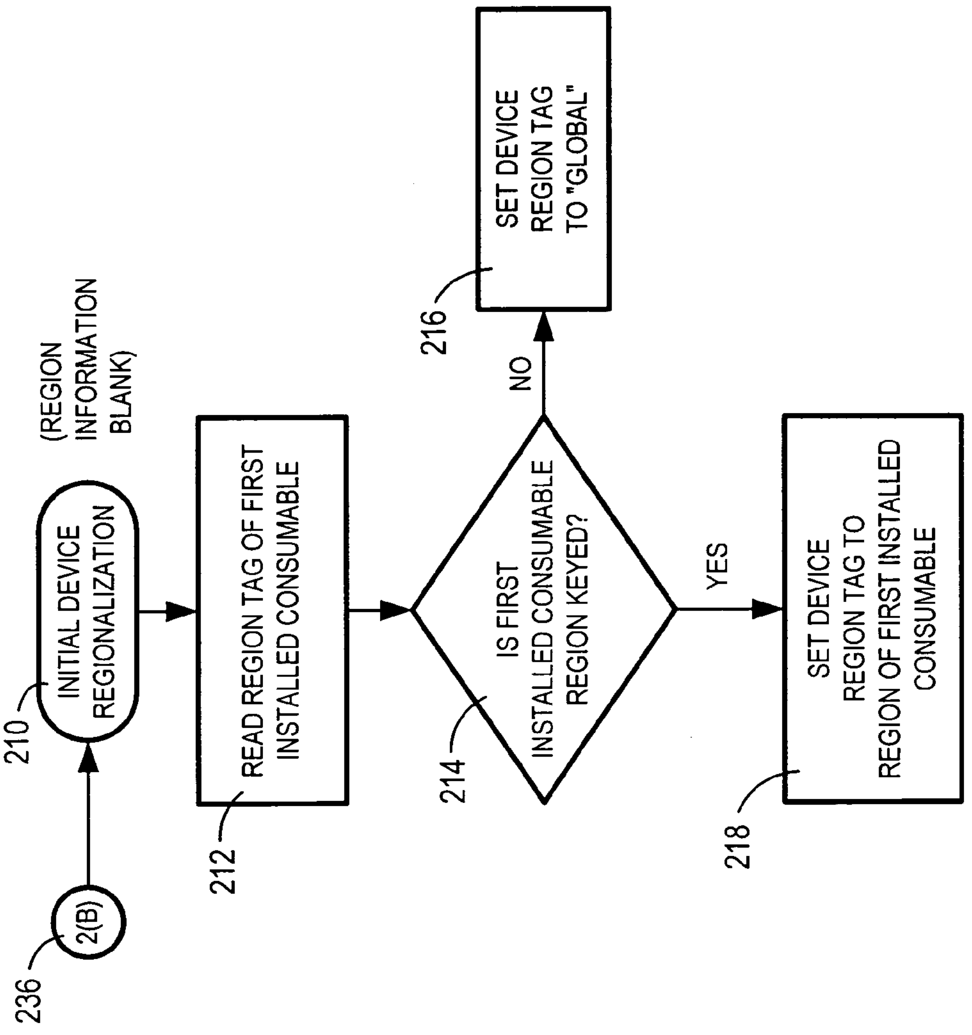
FIGS. 2(*a*) and 2(*b*) are flow charts illustrating the logic incorporated into the consumable-utilizing device to implement the present invention, with FIG. 2(*a*) showing the logic followed during initial setup of the device, and FIG. 2(*b*) showing the logic followed when a consumable is replaced.
Figure 2B:
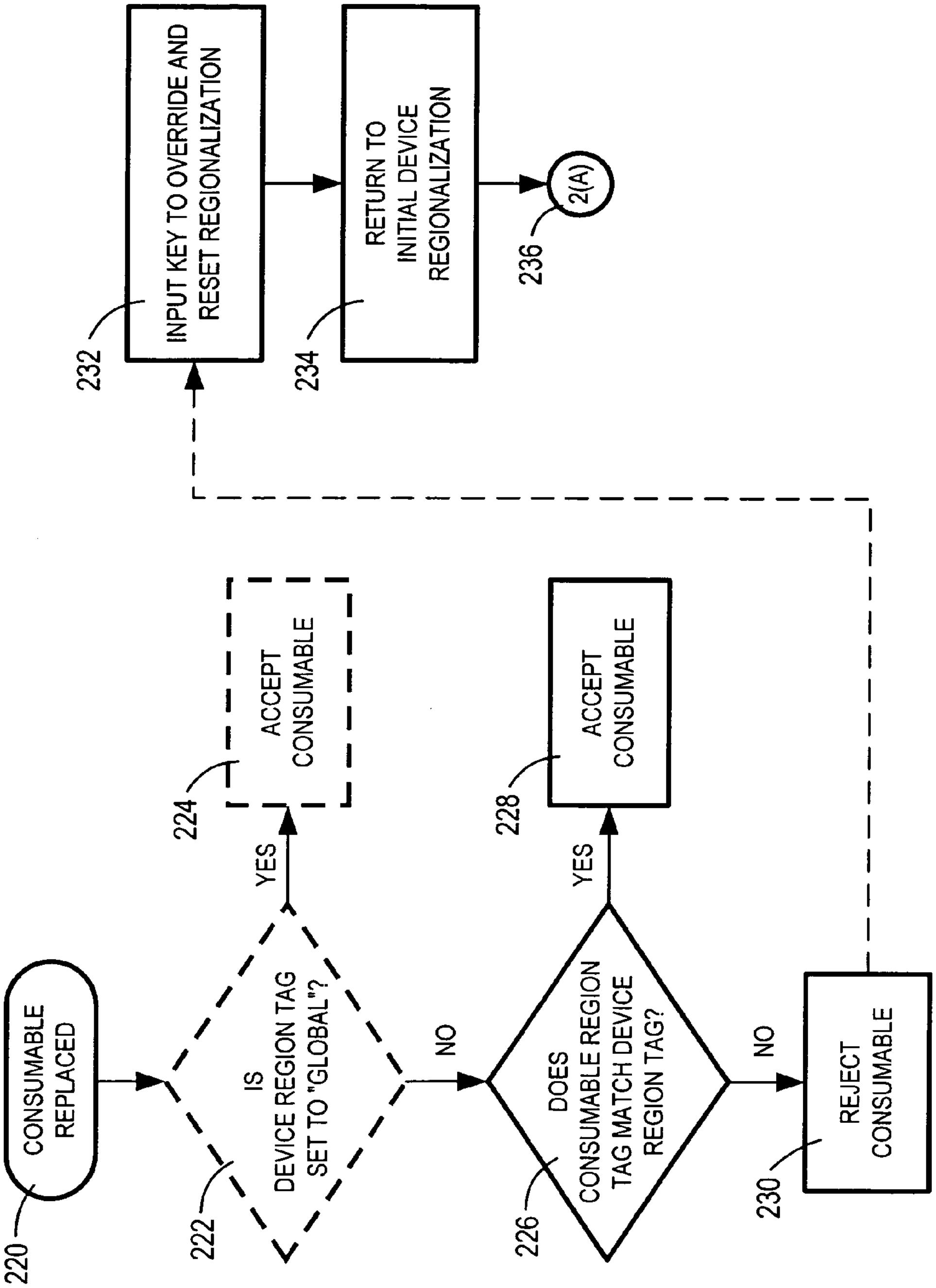

FIG. 2(*a*) is a flowchart illustrating the logic incorporated into the consumable-utilizing device to implement the present invention, showing the steps followed during initial setup of the device. Most devices such as printers, plotters, fax machines and the like include a controller such as a microprocessor, and the logic illustrated in FIG. 2(*a*) would be implemented as part of the initialization routines executed by the microprocessor when the device is initially powered.

When power is first applied to the utilizing device, information stored in nonvolatile form would indicate to the device that regional initialization is required (or similar information would be communicated to the device, such as from the computer to which the device is connected, when the software driver for the device is installed). The processor of the device would begin the initialization process 210.

The utilizing device reads the region tag of the first installed consumable 212, which in the preferred implementation is the consumable packaged with the device at the regional packaging center.

It is anticipated that not all geographic regions would receive regionalized products. In those markets where regionalization would give little benefit, the preferred embodiment of the invention anticipates that the consumables available in the normal chain of distribution would un-regionalized or "global" consumables.

If the first installed consumable is not regionalized 214, the device sets its own non-volatile region tag to "global" 216, indicating that it will henceforth accept all non-regionalized consumables. If the consumable is regionalized, the utilizing device sets its own region tag to the region of the consumable 218, indicating that it will henceforth only accept consumables having that same region tag.

FIG. 2(*b*) is a flowchart illustrating the logic followed by utilizing device when a consumable is replaced 220 (the actual checking of the consumable region tag could occur at any reasonable point, such as anytime power is applied to the utilizing device).

In the preferred embodiment of the invention, the device then simply requires that the region tag of the consumable match the region tag in the device memory 226, and accepts 228 the or rejects 230 the consumable accordingly, regardless of whether the device is "global" or "regionalized" (thus skipping the decision box 222).

In an alternative embodiment, indicated by the dashed outlines at 222 and 224, the utilizing device first determines whether its own region tag is set to "global" 222. If global, the device will accept any consumable 224, regardless of region. If the utilizing device is regionalized, it then determines if the consumable region tag matches its own region tag. If yes, the device accepts the consumable 228. If no, the device rejects the consumable 230.

Rejecting the consumable may mean that the device does not function, that it generates an error indication, or that it partially functions or functions in an alternate or degraded mode.

To protect the consumer from having a permanently disabled or degraded device, the preferred implementation of the invention anticipates a recovery path, as indicated by the dashed line in FIG. 2(*b*). This path may involve the consumer contacting the manufacturer of distributor to obtain a key to override and reset the regionalization setting 232 of his device, using cryptography techniques well-known in the art. The device may then return to the the initial device regionalization state 234 of FIG. 2(*a*) 236.

In some applications to which the present invention is applicable, the device into which the consumable is installed may not have an internal processor and memory, or the ability to detect the regionalization of the consumable item, but is associated with equipment having the requisite capabilities. For example, a piece of mechanical machinery may not have an internal processor, but is connected to a controller having a processor, memory, and an ability to determine the region keying of a consumble.

The Presently Preferred Implementation

Although it is anticipated that the invention will find use in many fields and is not limited to its use with printers, the presently preferred implementation of the invention involves the regionalization of ink jet cartridges and printers.

Figure 3:
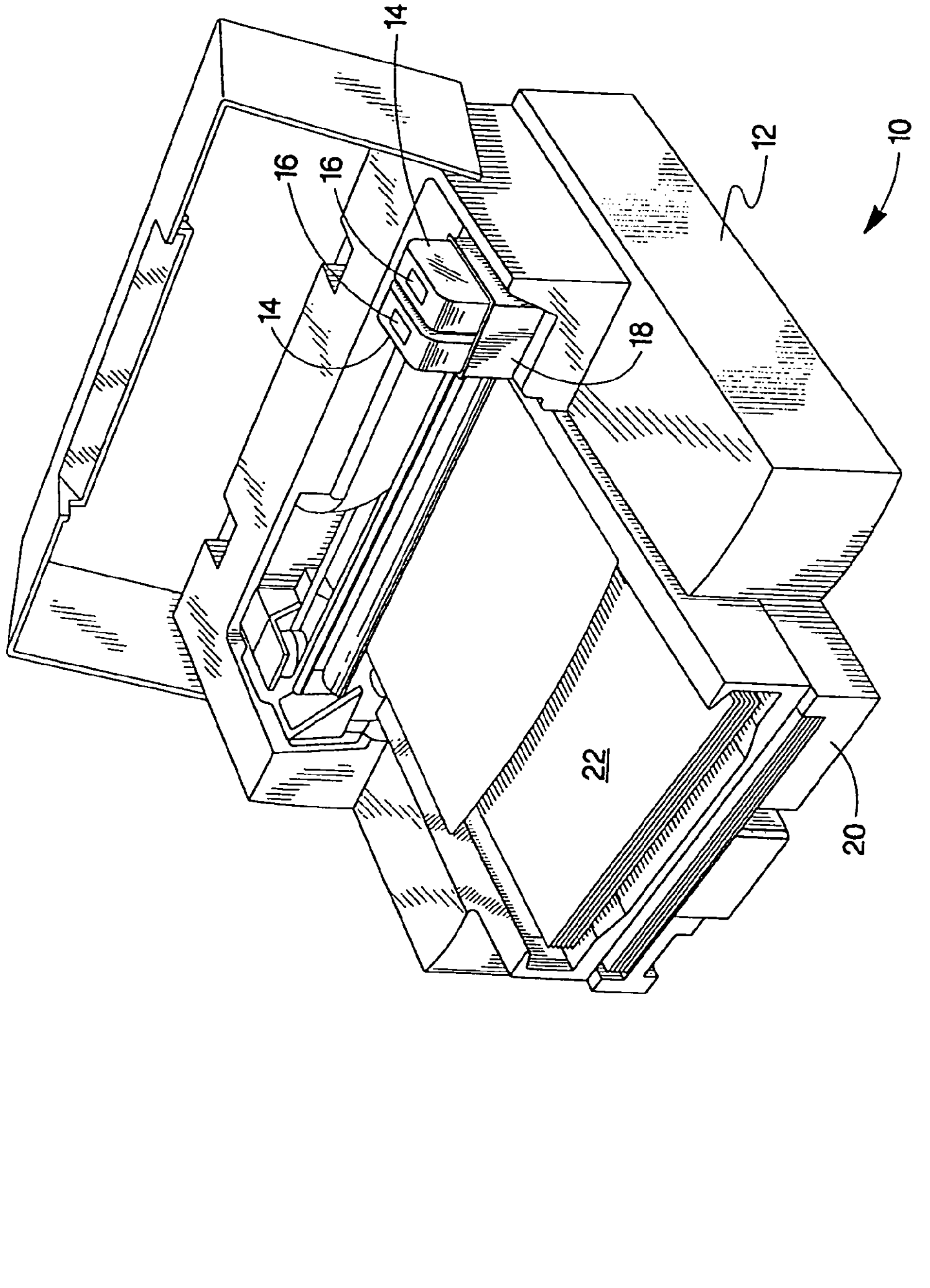
FIG. 3 depicts a typical printing system with which the present invention may be used that incorporates a consumable printing component, shown in a top perspective view with a printer cover open.

FIG. 3 is a perspective view of a typical printing system 10 with the present invention may be used, shown with its cover open. The printing system 10 includes a printer portion 12 and one or more replaceable printing components 14, such as ink cartridges, installed therein. The printer portion 12, together with the replaceable printing component(s) 14, accomplish printing on print media. Each consumable 14 includes a linking device 16 for exchanging status information between the printer portion 12 and the consumable 14. The use of the linking device 16, together with a corresponding linking device (not shown) associated with the printer portion 12, allows the printer portion 12 to monitor status of the replaceable printing components 14, and to read the included memory component.

In one preferred embodiment, the printing system 10 is an ink jet printing system. For the ink jet printing system 10 shown in FIG. 3, the consumable 14 is an ink reservoir that is in fluid communication with an ink jet printhead. Each of the replaceable printing components 14 or ink reservoirs are installed in a scanning carriage 18 that is moved relative to print media. The ink jet printer portion 12 includes a media tray for supplying print media 20 and a media tray for receiving print media 22. As media step through a print zone, the scanning carriage moves the replaceable printing components 14 and printheads relative to the print media 22. The printer portion 12 selectively activates the printhead portion associated with the replaceable printing components 14 to deposit ink on print media to thereby accomplish printing.

The printing system shown in FIG. 3 is shown with two replaceable printing components 14, one representing an ink reservoir having separate chambers containing cyan, magenta and yellow inks, and one representing an ink reservoir containing black ink. The replaceable printing components 14 are used together to accomplish 4-color printing. The method and apparatus of the present invention are also applicable to printing systems 10 that make use of other arrangements such as printing systems that use greater or less than 4 ink colors, as in high fidelity printing which typically use 6 or more ink colors. In either case, the printing system 10 includes one or more replaceable printing components 14, each having a linking device 16 associated therewith for providing status and regionalization information to the printer portion 12.

The method- and apparatus of the present invention is applicable to ink jet printing systems 10 having other configurations than those shown in FIG. 3. For example, the replaceable printing component 14 can be a printhead portion mounted on the scanning carriage 18, or a separate ink reservoir portion mounted off the scanning carriage that is in fluid communication either intermittently or continuously with the printhead portion. In this case, each of the printhead portion and the ink reservoir portion is a separate replaceable printing component 14. The ink reservoir portion is replaced when the ink is exhausted and the printhead portion is replaced at the end of life. Although it is anticipated that only the ink reservoirs will be regionalized, the techniques of the present invention may be applied to other replaceable components, such as printheads. The present invention is also suitable for use with any component that is subject to wear or is replaced periodically, such as motors and service stations for servicing the printhead, to name a few. The present invention allows the regionalization of each of these replaceable printing components 14 to be determined by the printer portion 12.

In the presently preferred implementation, the memory component and wireless link used for regionalization information of an ink jet cartridge is shared with circuitry providing the printer with other information about the cartridge, such as a determination of the remaining ink supply in the cartridge and other status and compatibility information.

Figure 4:
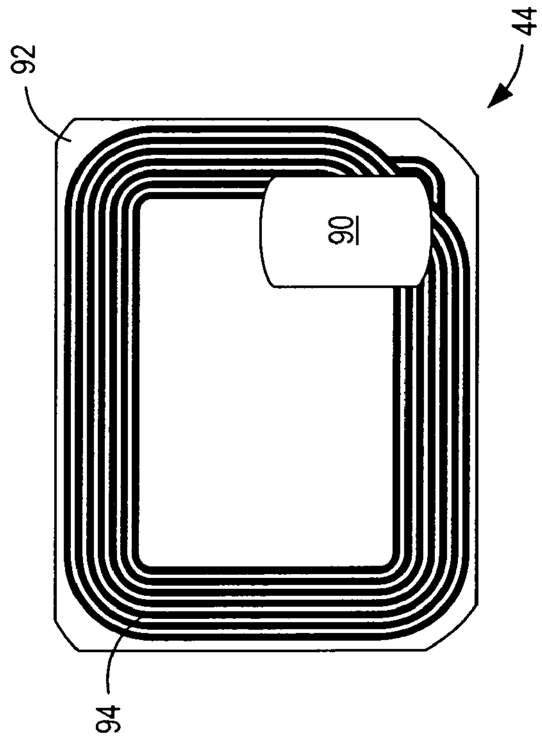
FIG. 4 is an underside plan view of a presently preferred linking device that is integrated into a label for attachment to the consumable printing component.

FIG. 4 is a representation of the electronic components 44 of the linking device 16. In the presently preferred implementation, the electronic components 44 are placed on a label containing sensors for detecting the remaining ink supply and then affixed to the ink reservoir, as described below.

The electronic components 44 comprise an integrated circuit 90 which is die bonded and wire bonded to a fiberglass substrate 92, and then encapsulated in epoxy. A printed circuit antenna 94 is formed on the fiberglass substrate to receive data and power and to transmit data.

Figure 5:
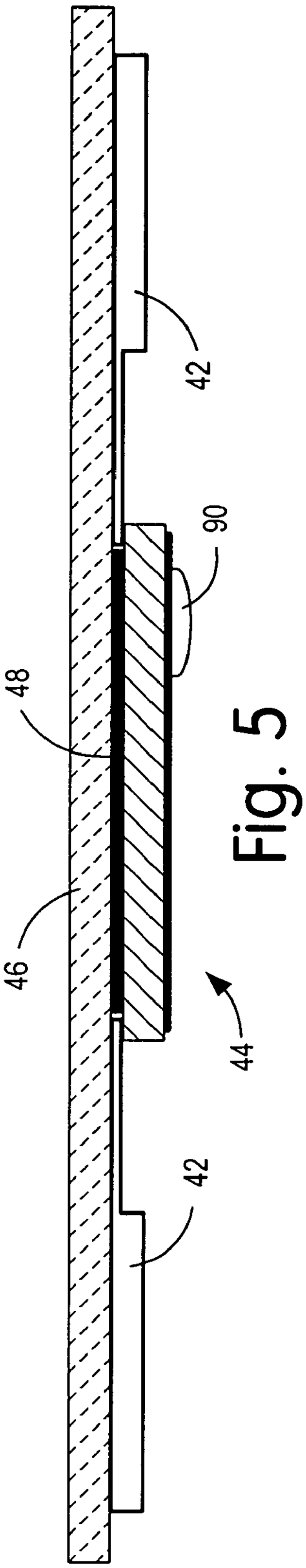
FIG. 5 is a section view taken across lines 5—5 of the label and linking device shown in FIG. 4.

FIG. 5 shows the electronic components 44 of the linking device 16 attached to the label portion by an adhesive 48 which securely binds the link 44 to the label 46. A sensor 42 for detecting the remaining ink supply is defined by depositing conductive in on the label 46 to form electrodes. The sensor 42 or electrodes are electrically connected to the electronic components 44 so that remaining ink status information is provided to the electronic components 44.

Figure 6:
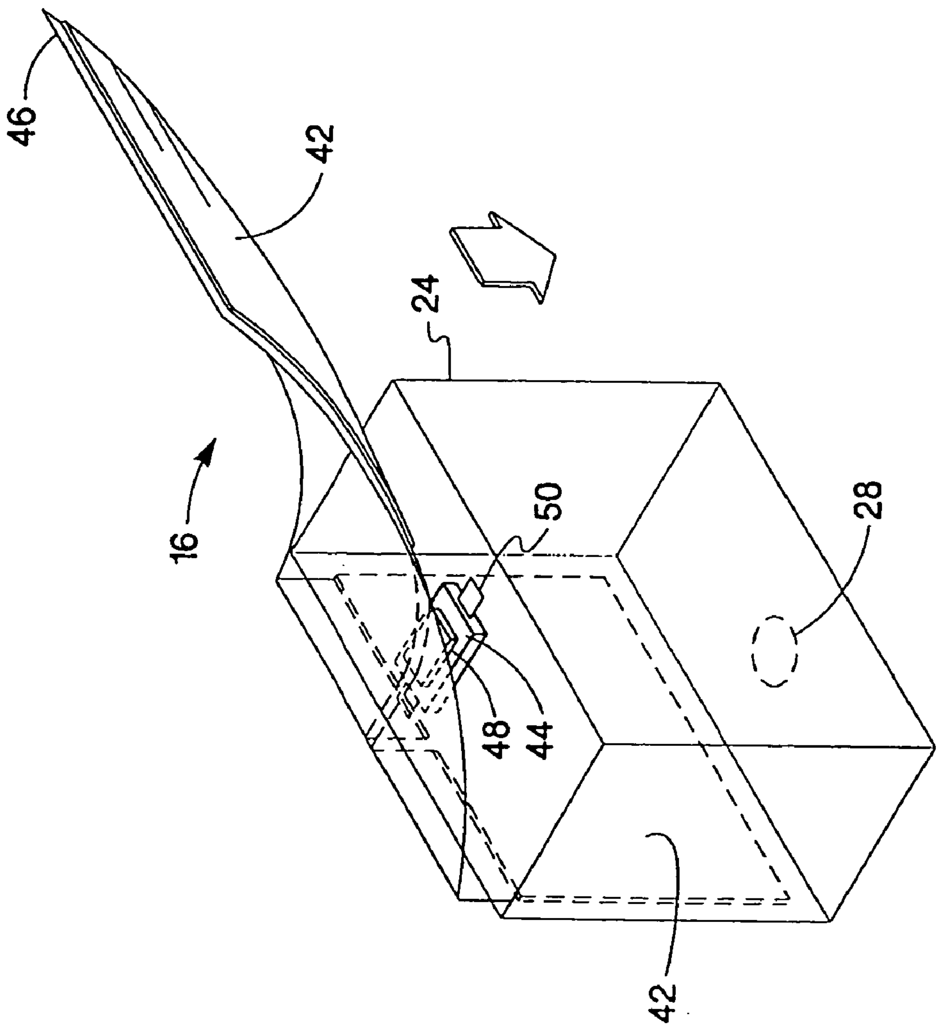
FIG. 6 depicts positioning of the label and linking device of FIG. 4 onto the consumable printing component.
Figure 7:
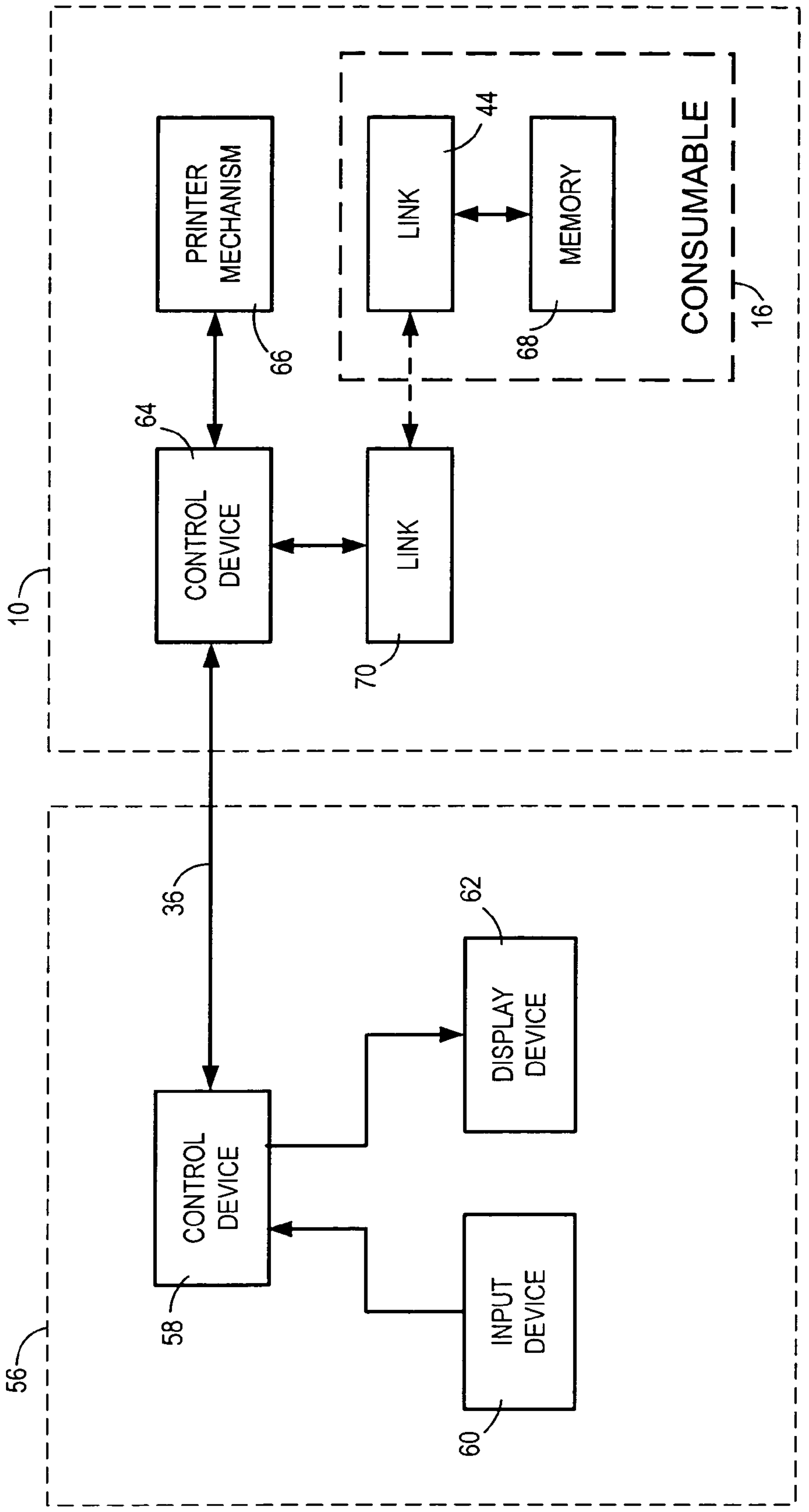
FIG. 7 is a simplified block diagram of the linking device associated with the consumable and the printer portion.

FIG. 6 shows the linking device 16 partially positioned on the consumable 14. The linking device 16 is attached to the ink reservoir 24 with application of the label 46 to the ink reservoir 24. The sensors 42 for detecting the remaining ink supply fold down on either side of the consumable housing 24. Electrical contacts 50 provide interconnection between the sensors and the electronic components 44. On a side of the label opposite the sensor 42, product identification information can be printed. Also indicated for reference in FIG. 6 is the consumable ink fluid outlet 28. FIG. 7 is a simplified block diagram of the printing system 10 of the present invention shown connected to an information source or host device 56. The information source 56 provides information 36 such as image descriptions to the printing system 10 for printing on print media. The information source 56 includes a control device 58, an input device 60, and a display device 52. The control device 58 is a microprocessor, a microprogram device, or a hardware implemented device. The control device 58 is connected to a display device 62 such as a monitor and receives input from the input device 60 such as a keyboard. The information source 56 can be any source of information that is acceptable to the printing system 10 such as a personal computer, work station, web appliance, digital camera or server, to name a few.

The printing system 10 includes a control device 64 for receiving image information from the information source 56 and controlling a printer mechanism 66 accordingly for forming images on print media. The control device 64 associated with the printing system 10 in the case of an inkjet printer formats image information and stores this image information for controlling various printing system 10 functions to accomplish printing. These printing system 10 functions include controlling the motion of the scanning carriage 18, controlling the media feed to step print media 22 through the print zone, and activating the printhead 38 to deposit ink on print media 22 so as to form an image on this media which corresponds to the image information received from the information source.

The printing system 10 includes the linking device 16 associated with the replaceable printing component 14. The linking device 16 includes the link 44. In one preferred embodiment, the linking device 16 includes an electrical storage device 68 such as a semiconductor memory that is electrically connected to the link 44. The link 44 together with a corresponding link 70 that is electrically connected to the control device 64, allows information to be transferred between the linking device 16 and the printing system 10 without direct electrical contact. The link 44 associated with the replaceable printing component and the link 70 associated with the printing system 10 do not require electrical interconnects to pass information therebetween. Among the information passed between the link 44 and the link 70 are the regionalization information and consumable status information. This status information includes marking material status such as a low ink signal or a signal indicative of remaining ink. In addition, information regarding various parameters associated with the replaceable printing component 14 that are stored in the electrical storage device 68 can be passed between links 44 and 70.

The status of the replaceable printing component 14 can be retrieved either under control of the control device 64 such as at device initialization, at periodic intervals, or status can be requested by the customer. The customer can request status of the replaceable printing component 14 either through the information source 56 or through the use of an input device such as a switch associated with the printing system that provides a request through the control device 64. In response to the request for a replaceable printing component 14 status, the control device 64 retrieves status information either for printing this information using the printer mechanism 66 or displaying this information using the display device 62 associated with the information source 56.

Figure 8:
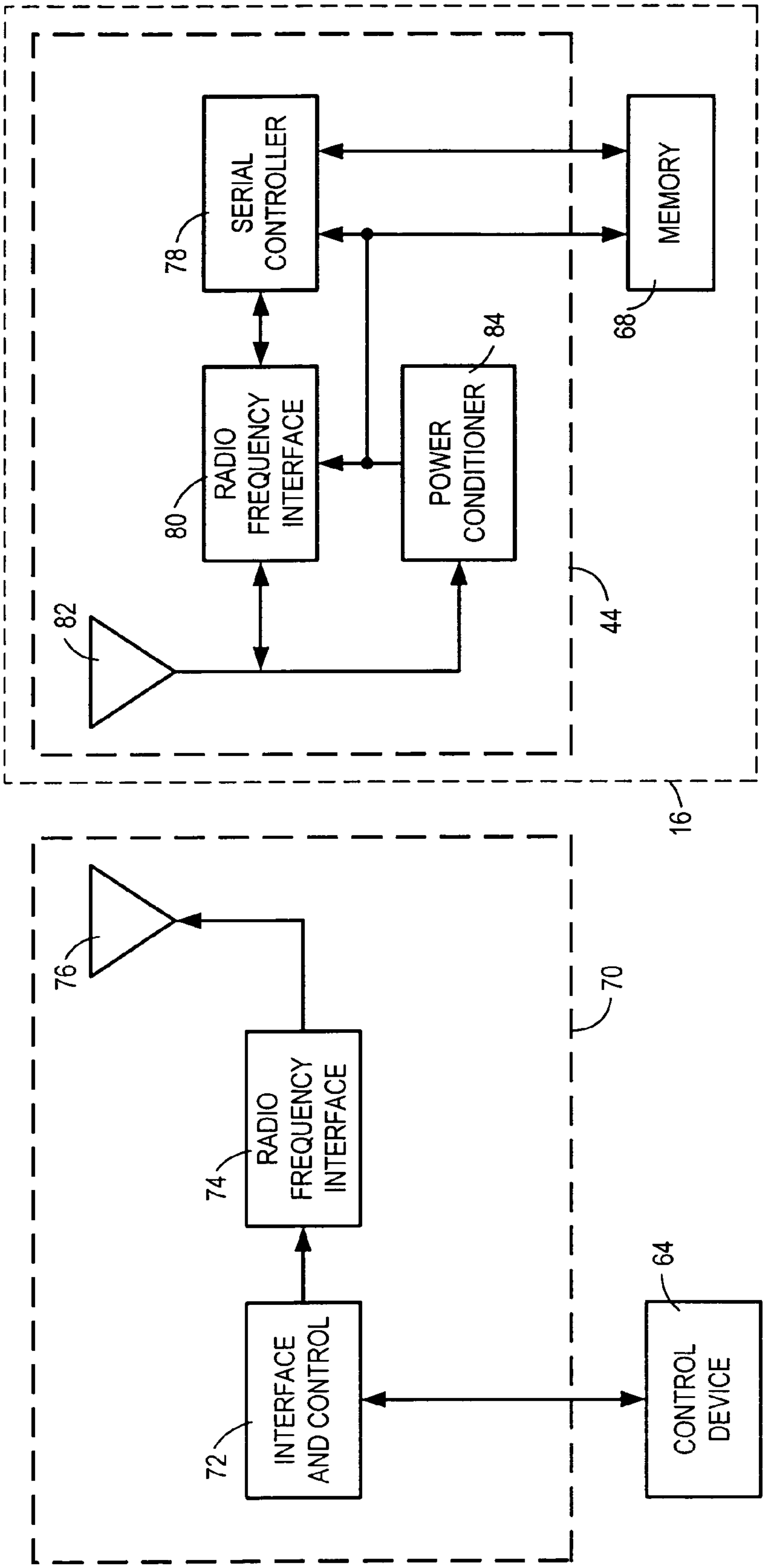
FIG. 8 is an electrical block diagram showing the consumable printing component linked to either the keying device or a host computer for transferring information therebetween.

FIG. 8 depicts further detail of the link device 44 on the consumable and the corresponding link device on either the regional keying device 130 or the host printer system 10. The linking device 70 associated with the keying device 130 or host printer system 10 includes a serial controller 72, a radio frequency interface 74, and an antenna 76. The serial controller 72 controls the transfer of information between the control device 64 and the radio frequency interface 74. The serial controller 72 is preferably a microprocessor, a programmable controller or a hardware implemented controller that performs the necessary interface and data manipulation functions for passing information between the control device 64 and the radio frequency interface 74. Information transferred between the control device 64 and the serial controller 72 includes command information for requesting status as well as the status information itself. This command information is provided to the linking device 16, whereupon the linking device 16, provides the requested status information. In one preferred embodiment, information is transferred between the serial controller 72 and the control device 64 in a parallel format, and information is transferred between the serial controller 72 and the radio frequency interface 74 in a serial format.

The radio frequency interface 74 receives information from the serial controller 72 in a serial fashion and converts this information into time varying voltages at the antenna 76. These time varying voltages are preferably in a standard radio frequency range such as 125 kilohertz to 13.56 megahertz. Radio frequencies outside this range may also be suitable. Transmission of information using a radio frequency technology is used in financial transaction cards provided by financial institutions for various types of transactions such as banking and using debit cards and credit cards. These financial transaction cards are sometimes referred to as "smart cards". Similar technology is also used in inventory systems that are sometimes referred to as radio frequency identification (RFID) technology.

The link 44 associated with the linking device 16 is similar to the link device 70 associated with the regional keying device 130 or printing system 10. The link 44 includes a serial controller 78, a radio frequency interface 80 and an antenna 82, each of which are similar to corresponding features of the link 70. The voltages are induced on antenna 82 in response to time varying voltages provided to antenna 76. Information is extracted from the time varying voltages induced on antenna 82 by the radio frequency interface 80. Information is passed from the radio frequency interface 80 to the serial controller 78. In response to command information, the serial controller 78 can store information such as regionalization data or ink level information in the electrical storage device 68. In addition, in response to command information, the serial controller retrieves information from the electrical storage device 68. The information such as regionalization data or ink level information is transferred to the serial controller 78 to be sent to the link 70 associated with the printer portion 12 in a manner similar to the transfer of information from the link 70 to link 44.

In the preferred embodiment, each of the link 44 and the electrical storage device 68 associated with the linking device 16 is either an active device powered by a battery or a passive device that stores energy in a storage device such as a capacitor. In the case of a passive device, energy is provided to the capacitor by voltages induced on the antenna 82. In the preferred embodiment, voltages are induced on the antenna 82 due to time varying voltages that are applied to the antenna 76 by the radio frequency interface 74. The induced voltage at the antenna 82 is provided to a power conditioner 84 which converts these time varying voltages into a single polarity voltage that is suitable as a supply voltage for each of the electrical storage device 68, the serial controller 78 and the radio frequency interface 80. In one preferred embodiment, the power conditioner 84 rectifies a time varying voltage that is induced on the antenna 82 and filters this rectified voltage to provide a suitable supply voltage.

To power the link 44, a time varying electromagnetic field induces a voltage on antenna 82. The modulation of this time varying electromagnetic field allows information to be transferred to the link 44. For example, a carrier signal can be provided by the link 70 to induce a time varying voltage at antenna 82. This time varying voltage is rectified and filtered by the power conditioner 84 to provide a supply voltage to the link 44 and electrical storage device 68. The radio frequency interface 74 modulates the carrier signal such that by varying the frequency, phase or amplitude, information is transmitted to the link 44. The modulation of the carrier signal allows the radio frequency interface 80 to extract information from the carrier signal. Information is transferred in a similar manner from the link 44 back to the link 70. Use of a power conditioner 84 on the link 44 eliminates the need for a direct power and ground connection between the linking device 16 and the printing system 10.

The present invention is applicable to a variety of other types of printing systems as well. For example, the present invention is suitable for use with electrophotographic printing systems. In the case of electrophotographic printing systems, the replaceable printing component is a replaceable component such as a supply of printing material usually referred to as a toner cartridge.

In operation, the control device 64 associated with the printing system 10 requests status of the replaceable printing component 14. The replaceable printing component determines its status by using a sensor 42 such as an ink level sensor, or retrieves the requested information from memory 68. The link 44 then transmits the status information to the link 70. The link 70 then provides the status information to the control device 64. The control device 64 responds to the status information accordingly. For example, upon an out-of-ink condition, the control device 64 notifies the customer of this condition so that the replaceable printing component 14 can be replaced.

The use of the linking device 16 is a relatively low cost method for determining status such as ink level condition of a replaceable ink reservoir 34. The linking device 16 is added to the ink reservoir using a relatively low cost manufacturing technique of applying a label to the ink reservoir. This technique does not require a high degree of alignment, nor does this system require difficult manufacturing steps.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

The corresponding structures, materials, acts, and equivalents of all means or step plus function elements in the claims below are intended to include any structure, material, or acts for performing the functions in combination with other claimed elements as specifically claimed.

What is claimed is:

1. A method of regionalizing a manufactured device and consumable items utilized by the device, the device having an associated memory and the consumable items each having an information retaining mechanism, the method comprising:

for each consumable item distributed within a region, pre-configuring the information retaining mechanism therein with region identification information that uniquely identifies the region;

installing in the device a consumable item having an information retaining mechanism pre-configured for the region;

transferring the region identification information from the consumable item information retaining mechanism to the memory associated with the device and storing the region identification information therein;

if the device is in a non-regionalized condition, permanently configuring the device in a regionalized condition based on the region identification information stored in the memory; and once the device is in the regionalized condition, prohibiting the device from consuming a material supplied by a subsequently installed consumable item that is not pre-configured for use in the region.

2. The method of regionalizing a manufactured device and consumable items utilized by the device of claim 1, wherein the memory associated with the device is an electronic memory within the device.

3. The method of regionalizing a manufactured device and consumable items utilized by the device of claim 2, wherein the information retaining mechanism of each of the consumable items is an electronic memory, and transferring the region identification information comprises electronically reading the information from the electronic memory of the consumable item and electronically writing the region identification information to the electronic memory within the device.

4. The method of regionalizing a manufactured device and consumable items utilized by the device of claim 3, wherein the device further has an associated wireless communications link in data communication with the associated memory and the consumable items each further comprise a wireless communications link in data communication with the electronic memory, and electronically reading the region identification information from the electronic memory of the consumable is accomplished over the wireless links.

5. The method of regionalizing a manufactured device and consumable items utilized by the device of claim 1, wherein the device further comprises a printer and the consumable items further comprise printer consumables.

6. The method of regionalizing a manufactured device and consumable items utilized by the device of claim 5, wherein the printer is an ink jet printer and the printer consumables are ink jet cartridges.

7. A method of regionalizing a manufactured device and consumable items utilized by the device, the device having an associated memory and the consumable items each having an information retaining mechanism, the method comprising the steps of:

a) for each consumable item distributed within a region, pre-configuring the information retaining mechanism with region identification information that uniquely identifies the region;

b) installing in the device a consumable item having an information retaining mechanism pre-configured for the region;

c) transferring the region identification information from the consumable item information retaining mechanism to the memory associated with the device and storing the region identification information therein d) if the device is in a non-regionalized condition, then permanently configuring the device in a regionalized condition based on the transferred region identification information stored in the memory; and for each subsequently installed consumable item, e) testing the information retaining mechanism of the subsequently installed consumable item to determine the pre-configured region identification information contained therein;

f) comparing the pre-configured region identification information of the subsequently installed consumable with the region identification stored in memory, and g) if the region identifications do not match, declining the subsequently installed consumable.

8. The method of regionalizing a manufactured device and consumable items utilized by the device of claim 7, wherein the memory associated with the device is an electronic memory within the device.

9. The method of regionalizing a manufactured device and consumable items utilized by the device of claim 8, wherein the information retaining mechanism of each of the consumable items is an electronic memory, and the step of transferring region identification information from the consumable item to the electronic memory within the device comprises electronically reading the information from the electronic memory of the consumable item and electronically writing the information to the electronic memory within the device.

10. The method of regionalizing a manufactured device and consumable items utilized by the device of claim 9, wherein the device further has an associated wireless communications link in data communication with the associated memory and the consumable items each further comprise a wireless communications link in data communication with the electronic memory, and electronically reading the information from the electronic memory of the consumable is accomplished over the wireless links.

11. The method of regionalizing a manufactured device and consumable items utilized by the device of claim 7, wherein the information retaining mechanism of each of the consumable items is an electronic memory, and the step of transferring region identification information from the consumable item to the electronic memory within the device includes electronically reading the information from the electronic memory of the consumable item.

12. The method of regionalizing a manufactured device and consumable items utilized by the device of claim 11, wherein the device further has an associated wireless communications link in data communication with the associated memory and the consumable items each further comprise a wireless communications link in data communication with the electronic memory, and electronically reading the information from the electronic memory of the consumable is accomplished over the wireless links.

13. The method of regionalizing a manufactured device and consumable items utilized by the device of claim 7, wherein the device has an associated user interface allowing messages to be displayed to a user and also allowing responses to be input by the user, and the step of declining the consumable comprises notifying the device user of an incompatibility and requiring a specific response to be input by the user.

* * * * *